(12) United States Patent
Adachi et al.

(10) Patent No.: US 7,641,245 B2
(45) Date of Patent: Jan. 5, 2010

(54) VEHICLE REAR STRUCTURE

(75) Inventors: Junji Adachi, Ichinomiya (JP); Hiroaki Taniguchi, Ikeda (JP); Ryouhei Terachi, Ikeda (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/905,469

(22) Filed: Oct. 1, 2007

(65) Prior Publication Data
US 2008/0088141 A1    Apr. 17, 2008

(30) Foreign Application Priority Data
Oct. 11, 2006    (JP)    ............... 2006-277757

(51) Int. Cl.
*B60R 19/04*    (2006.01)
(52) U.S. Cl. .................. 293/102; 293/117; 296/187.11
(58) Field of Classification Search ................. 293/120, 293/102, 131, 112, 117; 296/187.03, 187.11; 362/505, 506
See application file for complete search history.

(56) References Cited

U.S. PATENT DOCUMENTS

| 4,466,646 A | * | 8/1984 | Delmastro et al. .......... 293/120 |
| 4,996,634 A | * | 2/1991 | Haneda et al. .............. 362/505 |
| 5,957,512 A | * | 9/1999 | Inada et al. ................. 293/102 |
| 6,663,150 B1 | * | 12/2003 | Evans ......................... 293/120 |

FOREIGN PATENT DOCUMENTS

| JP | U 3-84250 | | 8/1991 |
| JP | 2001-911874 | * | 7/2001 |
| JP | A-2005-252846 | | 3/2007 |
| JP | A-2007-062617 | | 3/2007 |
| RU | 2243112 | * | 12/2004 |

* cited by examiner

*Primary Examiner*—Dennis H Pedder
*Assistant Examiner*—Pinel E Romain
(74) *Attorney, Agent, or Firm*—Oliff & Berridge, PLC

(57) ABSTRACT

A vehicle rear structure is provided. The structure includes: a bumper reinforcement disposed such that the length direction thereof extends along a vehicle width direction; a bumper cover provided at a vehicle rear side of the bumper reinforcement; a reflector provided on the bumper cover such that a functional reflecting portion thereof is disposed directed towards the bumper reinforcement; and a reflector protecting member provided in the bumper reinforcement, including a bumper cover abutting portion that abuts the bumper cover during a vehicle rear collision, and a reflector accommodating portion capable of accommodating the reflector with a space when the bumper cover abuts the bumper cover abutting portion.

2 Claims, 8 Drawing Sheets

VEHICLE REAR STRUCTURE

CROSS-REFERENCE TO RELATED APPLICATION

This application claims priority under 35 USC 119 from Japanese Patent Application No. 2006-277757, the disclosure of which is incorporated by reference herein.

BACKGROUND OF THE INVENTION

1. Field of the Invention

The present invention relates to a rear structure of a vehicle and more particularly to a vehicle rear structure in which a reflector is attached to a bumper of the rear portion of vehicle.

2. Description of the Related Art

Conventionally, a vehicle rear structure including a reflector on a bumper at a rear portion of a vehicle has been known (for example, Japanese Utility Model Application Laid-Open (JP-U) No. 3-84250). According to this technique, the reflector is attached to the rear bumper provided at a lower position than a tale lamp.

However, the vehicle rear structure of the JP-U No. 3-84250 requires material and configuration which prevent easy deformation of the reflector mounted on the rear bumper so as to make it difficult for its light distribution capacity to lower, when the rear portion of vehicle makes a slight collision with other vehicle.

SUMMARY OF THE INVENTION

In view of the above described facts, the invention intends to provide a vehicle rear structure which is capable of preventing light distribution capacity of a reflector provided on a bumper from dropping at the time of collision at the vehicle rear portion with other vehicle.

A first aspect of the invention is a vehicle rear structure including: a bumper reinforcement disposed such that the length direction thereof extends along a vehicle width direction; a bumper cover provided at a vehicle rear side of the bumper reinforcement; a reflector provided on the bumper cover such that a functional reflecting portion thereof is disposed directed towards the bumper reinforcement; and a reflector protecting member provided in the bumper reinforcement, including a bumper cover abutting portion that abuts the bumper cover during a vehicle rear collision, and a reflector accommodating portion capable of accommodating the reflector with a space when the bumper cover abuts the bumper cover abutting portion.

When the rear portion of the vehicle collides at the rear side thereof with other vehicle, the bumper cover provided at the rear side of the vehicle with respect to the bumper reinforcement which the length direction thereof extends along the vehicle width direction moves from the rear side of the vehicle to the front side of the vehicle. As a result, the reflector which is provided on the bumper cover and the functional reflecting portion thereof disposed toward the bumper reinforcement moves to the side of the bumper reinforcement together with the bumper cover.

At this time, according to the present invention, the bumper cover abutting portion of the reflector protecting member provided in the bumper reinforcement abuts the bumper cover. The reflector accommodating portion of the reflector protecting member accommodates the reflector with a space (distance) with the bumper cover in a state that the bumper cover abutting the bumper cover abutting portion. As a result, since the reflector protecting member exists between the bumper cover and the bumper reinforcement, the reflector will not be crushed by a collided object and the bumper reinforcement.

This embodiment may include a reinforcement member which connects an extending portion being formed on the reflector protecting member and extending outward in the vehicle width direction from the bumper reinforcement, with an outside end in the vehicle width direction of the bumper reinforcement.

When the rear portion of a vehicle collides with other vehicle, a collision load acting on the extending portion which is formed on the reflector protecting member and projecting outward in the vehicle width direction than the bumper reinforcement is transmitted to the outside end in the vehicle width direction of the bumper reinforcement from the extending portion of the reflector protecting member, by the reinforcement member which connects the extending portion of the reflector protecting member with the outside end in the vehicle width direction of the bumper reinforcement. Consequently, moment in the vehicle front direction acting on the extending portion of the reflector protecting member is suppressed. As a result, deformation of the extending portion formed in the reflector protecting member in the vehicle front direction is suppressed.

According to this embodiment, the reflector protecting member may includes a flexed plate mounted on the bumper reinforcement, and the reflector accommodating portion may include a recess portion in which the reflector enters.

Because the reflector protecting member is composed of a flexed plate on the bumper reinforcement and the reflector accommodating portion is a recess portion in which the reflector is to enter, the structure of the reflector protecting member cam be made simple.

BRIEF DESCRIPTION OF THE DRAWINGS

Embodiment of the present invention will be described in detail based on the following figures, wherein.

DETAILED DESCRIPTION OF THE INVENTION

The embodiment of the vehicle rear structure of the present invention will be described with reference to FIGS. 1 to 8.

Hereinafter, an arrow UP in the Figures indicates an upward direction in the vehicle, an arrow FR in the Figures indicates a front direction of the vehicle and an arrow IN in the Figures indicates an inward direction in the width direction of the vehicle.

Figure 8:
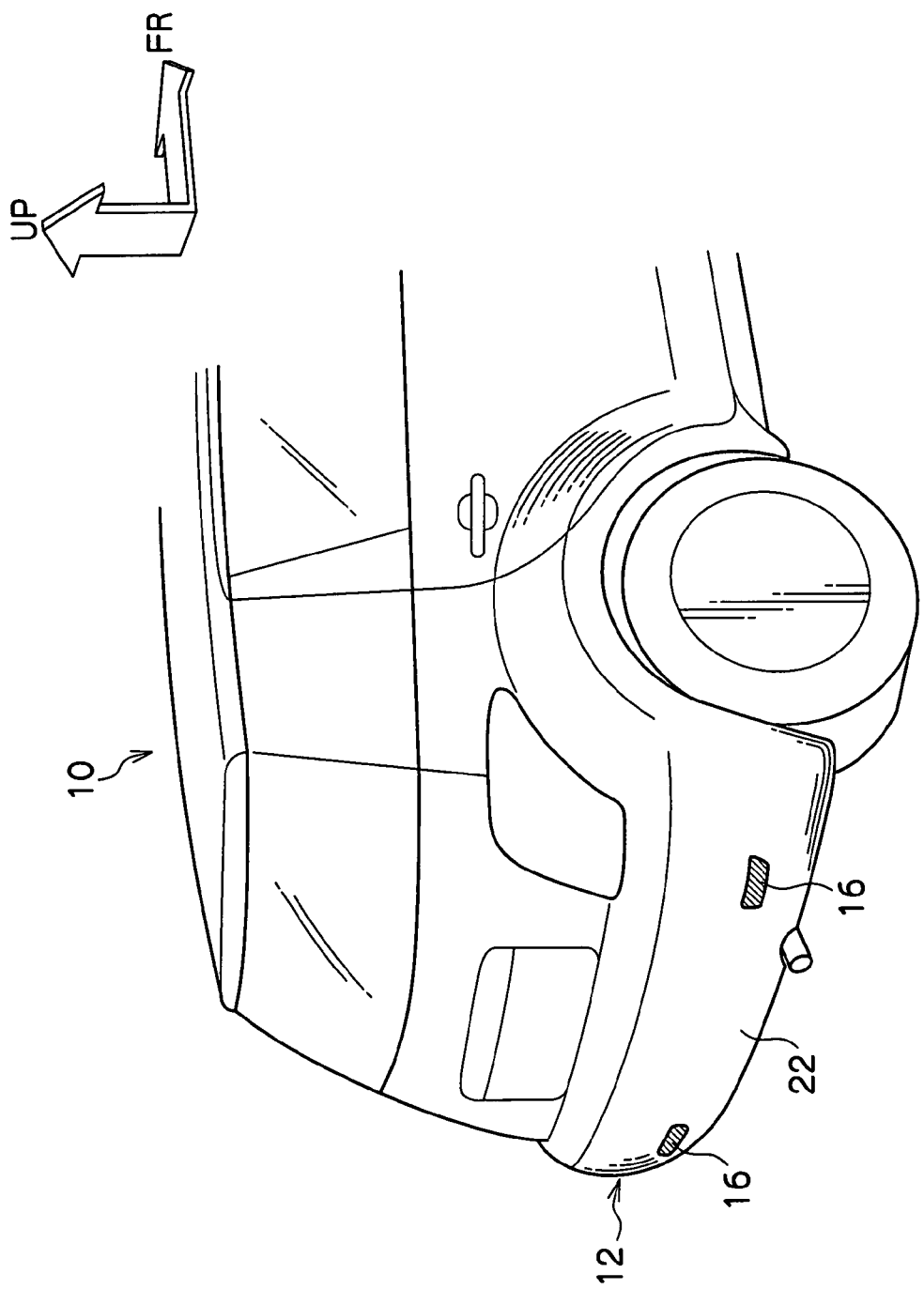
FIG. 8 is a perspective view of the rear portion of vehicle to which the vehicle rear structure of the embodiment of the invention is applied, seen from behind the vehicle.

FIG. 8 is a perspective view of the rear portion of a vehicle to which the vehicle rear structure of the embodiment of the invention is applied, seen from behind the vehicle.

As shown in FIG. 8, a rear bumper 12 is provided on the bottom of the rear end of a vehicle 10 such that its length direction extends along the vehicle width direction and when the vehicle 10 collides, the rear bumper 12 deforms to absorb the impact (collision energy). Reflectors 16 are provided in the vicinity of both ends in the vehicle width direction of the rear bumper 12.

Figure 2:
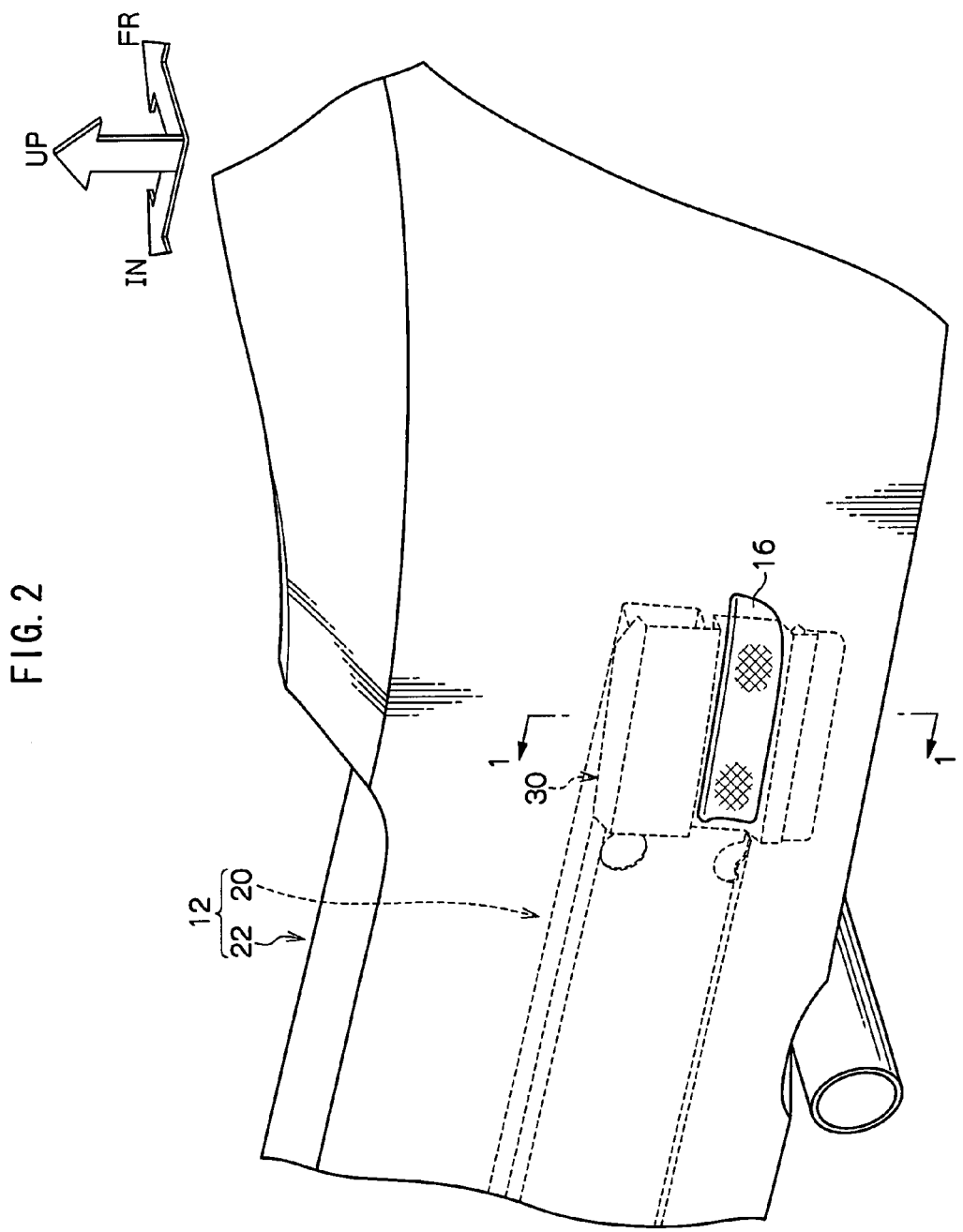
FIG. 2 is a perspective view of the vehicle rear structure according to an embodiment of the invention, seen obliquely from the outer side in the back of the vehicle.

FIG. 2 is a perspective view of an outer end portion of the rear bumper in the vehicle width direction in the vehicle rear structure according to an embodiment of the invention, seen from behind the vehicle.

As shown in FIG. 2, the reflector 16 seen from behind the vehicle has an elongated shape and is disposed such that its length direction extends along the vehicle width direction.

Figure 1:
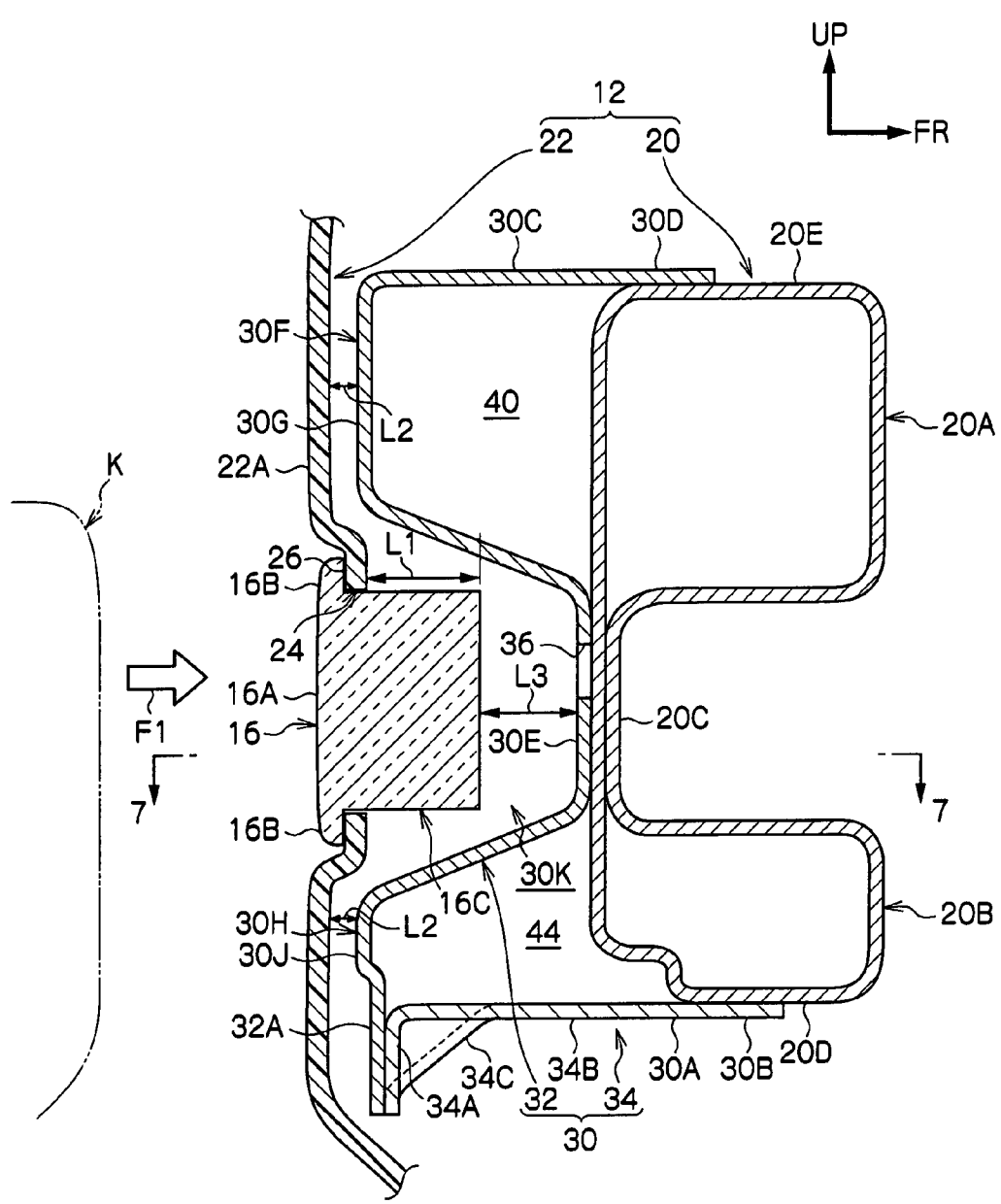
FIG. 1 is an enlarged sectional view taken along the line 1-1 of FIG. 2.

FIG. 1 shows an enlarged sectional view taken along the sectional line 1-1 in FIG. 2.

The rear bumper 12 includes a bumper reinforcement 20 and a bumper cover 22 provided at the rear side of the bumper reinforcement 20. The reflector 16 is mounted on a mounting hole 24 formed in the bumper cover 22.

Specifically, the mounting hole 24 is formed so that it penetrates the bumper cover 22 and a mounting flange 26 is formed around the mounting hole 24 such that the mounting flange 26 is dented in a front direction with respect to a vertical wall portion 22A of the bumper cover 22. On the other hand, a jaw portion 16B is formed at a vehicle rearward side end 16A of the reflector 16 such that it projects in the direction of the outer periphery of the reflector 16, and the jaw portion 16B is fixed to the vehicle rearward side face of the mounting flange 26.

Thus, a main body 16C as a functional reflecting portion of the reflector 16 projects (in amount of projection L1) toward the vehicle front direction with respect to the mounting flange 26 of the bumper cover 22.

The bumper reinforcement 20 is formed by connecting an upper portion 20A having a substantially rectangular enclosed sectional structure and a lower portion 20B having a substantially rectangular enclosed sectional structure by a rear wall portion 20C.

Figure 3:
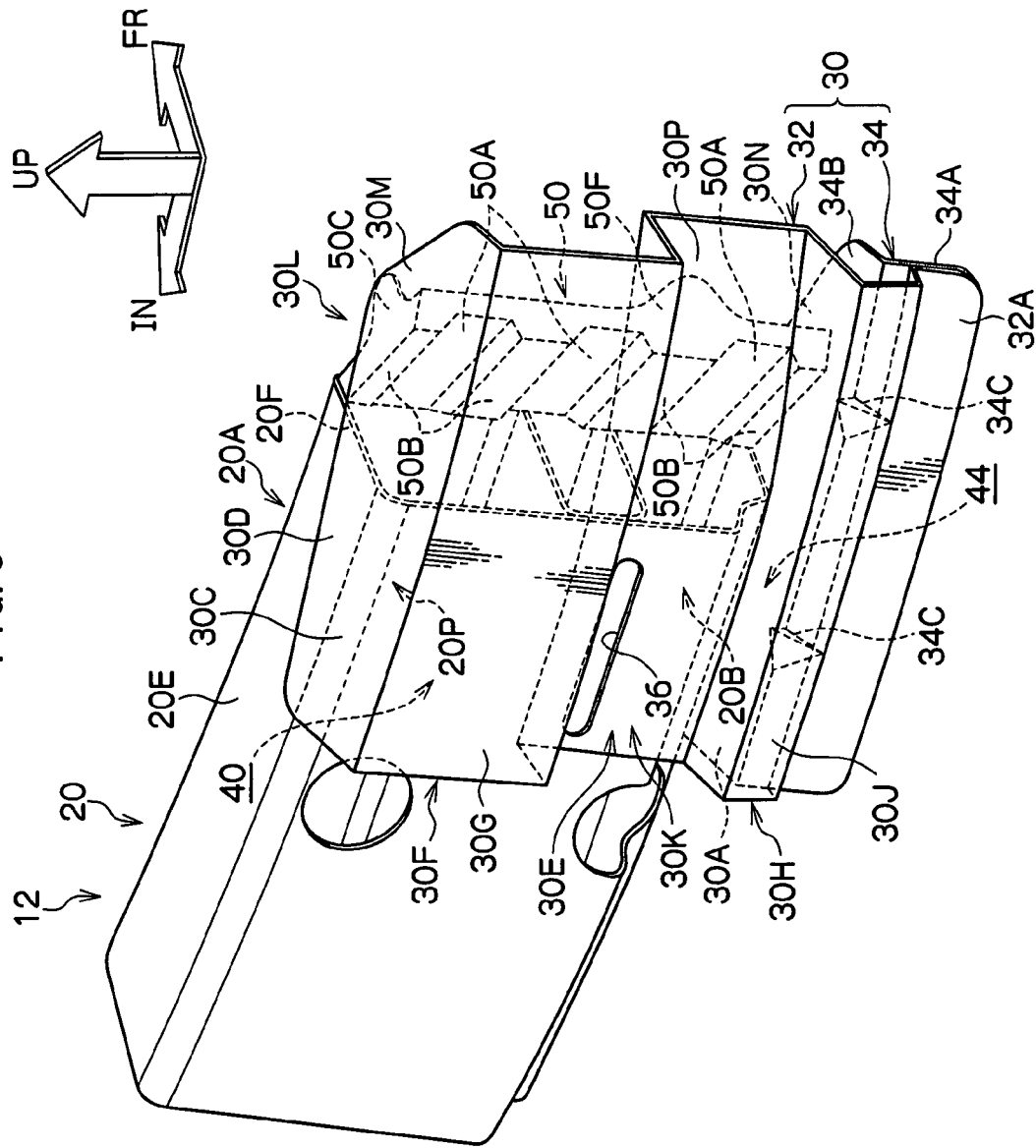
FIG. 3 is a perspective view of an end portion in the width direction of a bumper reinforcement of the vehicle rear structure according to an embodiment of the invention, seen obliquely from the outer side in the back of the vehicle.

FIG. 3 is a perspective view of an end portion in the vehicle width direction of the bumper reinforcement 20 seen obliquely from the outer side in the back of the vehicle.

As shown in FIG. 3, the end portion in the vehicle width direction of the bumper reinforcement 20 is curved toward the vehicle front direction and a reflector protecting bracket 30 as a reflector protecting member is provided at the end portion in the vehicle width direction of the bumper reinforcement 20.

As shown in FIG. 1, the reflector protecting bracket 30 is formed of an upper bracket 32 composed of a plate material constituting the upper portion of the reflector protecting bracket 30, and an under bracket 34 composed of a plate material constituting the lower portion of the reflector protecting bracket 30. A flange 34A formed at the rear end portion of the under bracket 34 and toward downward of the vehicle is connected to the vehicle front side face of a lower end portion 32A of the upper bracket 32. The under bracket 34 is composed of a plate material extending in the front-rear direction of the vehicle and a plurality of reinforcement ribs 34C are formed, at a specified interval in the vehicle width direction, between a main body portion 34B and a flange 34A, both constituting a lower wall portion 30A of the reflector protecting bracket 30.

A front end portion 30B of the lower wall portion 30A of the reflector protecting bracket 30 is coupled with a lower wall portion 20D of the lower portion 20B of the bumper reinforcement 20 by welding or the like.

On the other hand, a rear front end portion 30D of the upper wall portion 30C of the reflector protecting bracket 30 is coupled with an upper wall portion 20E of the upper portion 20A of the bumper reinforcement 20 by welding or the like.

An intermediate portion 30E in the vertical direction of the reflector protecting bracket 30 forms a vertical wall portion extending in the vertical direction of the vehicle and the intermediate portion 30E is coupled with the rear face of the rear wall portion 20C of the bumper reinforcement 20 by welding or the like.

A slit 36 for connecting operation is formed in the intermediate portion 30E, along in the vehicle width direction. By using this slit 36, the intermediate portion 30E can be welded to the rear face of the rear wall portion 20C of the bumper reinforcement 20.

A projecting portion 30F which is expanded in the backward direction of the vehicle is formed at the upper portion of the reflector protecting bracket 30. The projecting portion 30F forms an enclosed sectional portion 40 extending in the vehicle width direction with the upper portion 20A of the bumper reinforcement 20. The sectional shape of the enclosed sectional portion 40 seen in the vehicle width direction is a trapezoid having a width that increases in a downward direction from the rear side of the vehicle to the front side of the vehicle.

A distance in the front-rear direction of the vehicle between an upper vertical wall portion 30G of the reflector protecting bracket 30 which forms a rear wall portion of the enclosed sectional portion 40 and the vertical wall portion 22A of the bumper cover 22 is L2. The upper vertical wall portion 30G of the reflector protecting bracket 30 serves as a bumper cover abutting portion which abuts the vertical wall portion 22A of the bumper cover 22 during a collision at the rear side with the other vehicle.

A projecting portion 30H which is expanded in the backward direction of the vehicle is formed at the bottom portion of the reflector protecting bracket 30. The projecting portion 30H forms an enclosed sectional portion 44 extending in the vehicle width direction together with the lower portion 20B of the bumper reinforcement 20. The cross-sectional shape of the enclosed sectional portion 44 seen in the vehicle width direction is a trapezoid having a width that increases in an upward direction from the rear side of the vehicle to the front side of the vehicle.

An distance in the front-rear direction of the vehicle between a lower vertical wall portion 30J of the reflector protecting bracket 30 which forms a rear wall portion of the enclosed sectional portion 44 and the vertical wall portion 22A of the bumper cover 22 is L2. The lower vertical wall portion 30J of the reflector protecting bracket 30 serves as a bumper cover abutting portion which abuts the vertical wall portion 22A of the bumper cover 22 during a collision at the rear side with the other vehicle.

A recess portion 30K which serves as a reflector accommodating portion dented in the vehicle front direction is provided between the projecting portion 30F on the upper side of the reflector protecting bracket 30 and the projecting portion 30H on the bottom side. Thus, when the upper vertical wall portion 30G of the reflector protecting bracket 30 or the lower vertical wall portion 30J abuts the vertical wall portion 22A of the bumper cover 22, the main body 16C of the reflector 16 can be accommodated within the recess portion 30K with a space (distance) maintained with respect to an inner peripheral portion the recess portion 30K, including a bottom portion (the intermediate portion 30E) of the recess portion 30K.

That is, an distance L3 between the main body 16C of the reflector 16 and the intermediate portion 30E in the vertical direction of the reflector protecting bracket 30 is larger than the distance L2 between the upper vertical wall portion 30G and the lower vertical wall portion 30J of the reflector protecting bracket 30, and the vertical wall portion 22A of the bumper cover 22 in the vehicle front-rear direction (L3>L2). Accordingly, when the rear portion of the vehicle been collided, and the reflector 16 and the vertical wall portion 22A of the bumper cover 22 moves in the vehicle front direction so that the upper vertical wall portion 30G or the lower vertical wall portion 30J of the reflector protecting bracket 30 abuts the vertical wall portion 22A of the bumper cover 22, the main body 16C of the reflector 16 can be accommodated in the recess portion 30K of the reflector protecting bracket 30. At this time, the main body 16C of the reflector 16 will not contact with the inner peripheral portion including the bottom portion (the intermediate portion 30E in the vertical direction) of the recess portion 30K of the reflector protecting bracket 30.

As shown in FIG. 3, the outer side portion of the reflector protecting bracket 30 in the vehicle width direction is extended outward in the vehicle width direction with respect to the bumper reinforcement 20, whereby forming an extending portion 30L. The extending portion 30L of the reflector protecting bracket 30 and an outside end 20F of the bumper reinforcement 20 in the vehicle width direction are connected through a reinforcement bracket 50 as a reinforcement member.

Figure 4:
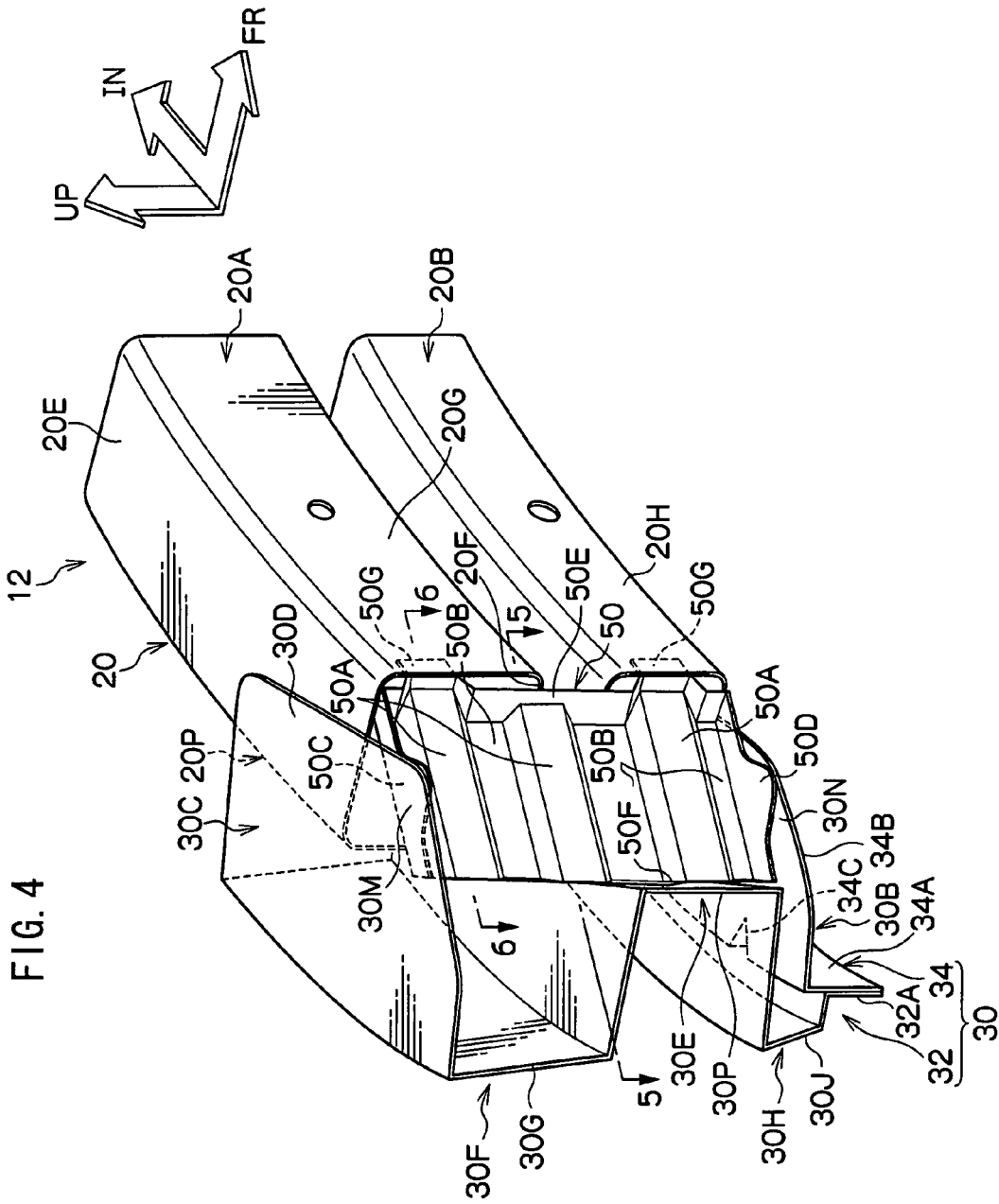
FIG. 4 is a perspective view of an end portion in the width direction of a bumper reinforcement of the vehicle rear structure according to an embodiment of the invention, seen obliquely from the outer side in the front of the vehicle.

FIG. 4 is a perspective view of an end portion of the bumper reinforcement 20 in the vehicle width direction seen obliquely from the outer side in the front of the vehicle.

As shown in FIG. 4, the reinforcement bracket 50 is a plate material in which a projecting portion 50A projecting in the vehicle front direction and a recess portion 50B dented in the backward direction of the vehicle are arranged alternately along the vertical direction of the vehicle. A flange 50C is formed at a top end of the reinforcement bracket 50 and toward the vehicle front direction. The flange 50C is coupled with an outside portion 30M in the vehicle width direction of the upper wall portion 30C of the reflector protecting bracket 30 by welding or the like. A flange 50D is formed at the bottom end of the reinforcement bracket 50 and toward the vehicle front direction. The flange 50D is coupled with an outside portion 3ON in the vehicle width direction of the lower wall portion 30A of the reflector protecting bracket 30 by welding or the like.

Figure 5:
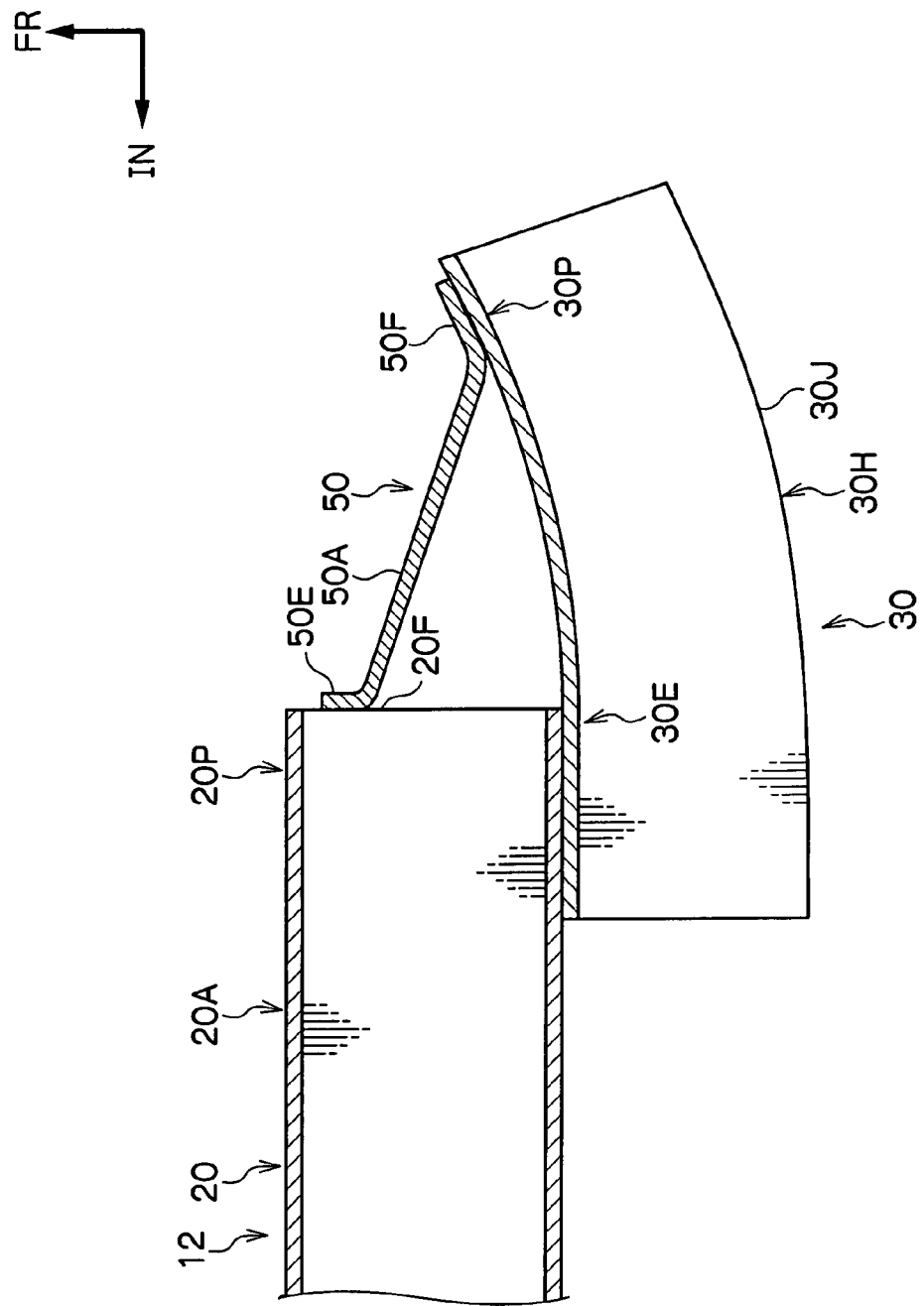
FIG. 5 is an enlarged sectional view taken along the line 5-5 in FIG. 4.
Figure 6:
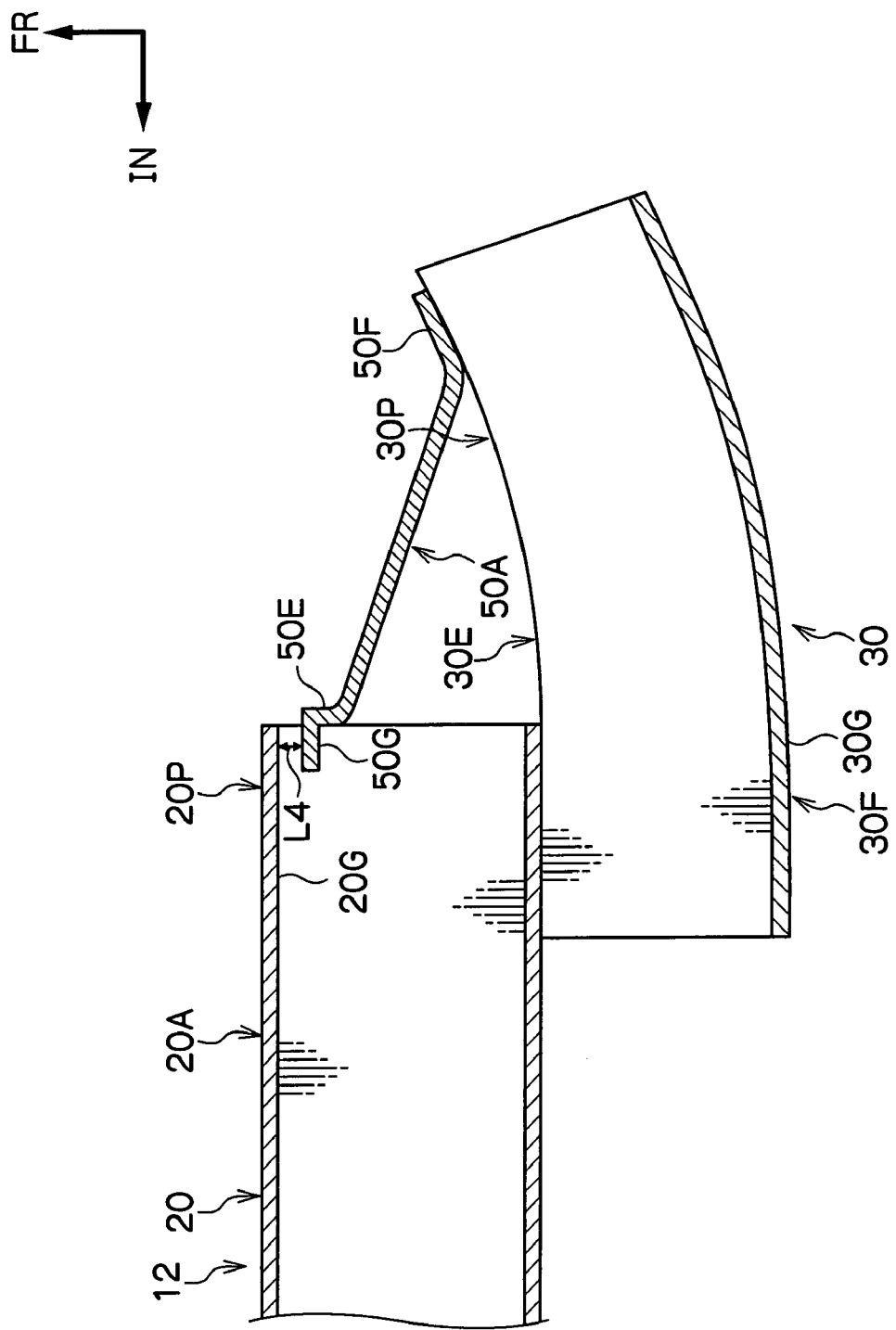
FIG. 6 is an enlarged sectional view taken along the line 6-6 in FIG. 4.

FIG. 5 shows an enlarged sectional view taken along line 5-5 of FIG. 4 and FIG. 6 shows an enlarged sectional view taken along the line 6-6 of FIG. 4.

As shown in FIG. 5, a vertical wall portion 50E extending in the vehicle front direction is formed at an inner end in the vehicle width direction of the reinforcement bracket 50. The vertical wall portion 50E is coupled with the outside end 20F in the vehicle width direction of the bumper reinforcement 20 by welding or the like. A flange 50F is formed at an outer end of the reinforcement bracket 50 in the vehicle width direction, toward substantially outward in the vehicle width direction. The flange 50F is coupled with the front face at an outside end 30P in the vehicle width direction in the intermediate portion 30E of the reflector protecting bracket 30.

As shown in FIG. 6, at an inner side portion in the vehicle width direction of the projecting portion 50A which is formed at the upper portion of the reinforcement bracket 50, a flange 50G is formed at the front end of the vertical wall portion 50E toward the inner side of the vehicle width direction. The flange 50G of the reinforcement bracket 50 is inserted into the upper portion 20A forming the enclosed sectional structure of the bumper reinforcement 20. A distance in the front-rear direction of the vehicle between the rear wall portion 20G of the upper portion 20A and the flange 50G of the reinforcement bracket 50 is L4.

As shown in FIG. 4, also at the inner side portion in the vehicle width direction of the projecting portion 50A formed at the bottom of the reinforcement bracket 50, another flange 50G is formed at the front end of the vertical wall portion 50E toward the inner side of the vehicle width direction. The flange portion 50G of the reinforcement bracket 50 is inserted into the lower portion 20B forming the enclosed sectional structure of the bumper reinforcement 20. An distance in the front-rear direction of the vehicle between the rear wall portion 20H of the wall portion 20B and the flange 50G of the reinforcement bracket 50 is also L4.

Therefore, as long as the reflector protecting bracket 30 moves towards the front direction of the vehicle to the bumper reinforcement 20 for an amount within the distance L4, the flange 50G of the reinforcement bracket 50 will not abut the rear wall portion 20G of the upper portion 20A of the bumper reinforcement 20. As a result, deformation of the bumper reinforcement 20 can be prevented.

Further, when assembling the reflector protecting bracket 30 and the reinforcement bracket 50 to the bumper reinforcement 20 after coupling them in the assembling process of the rear bumper 12, the flanges 50G of the reinforcement bracket 50 are respectively inserted into each of the upper portion 20A and the lower portion 20B of the bumper reinforcement 20. At this time, according to this embodiment, the distance L4 is formed in the front-rear direction of the vehicle between the rear wall portion 20G of the upper portion 20A and the flange 50G of the reinforcement bracket 50. Thus, the flanges 50G of the reinforcement bracket 50 become unlikely to interferer with the upper portion 20A and the lower portion 20B of the bumper reinforcement 20, thereby improving assembling efficiency and mass productivity.

In this embodiment, $L3 \geq L2+L4$. Thus, even if the reflector 16 moves the distance L2 in the front direction of the vehicle together with the bumper cover 22 and the reflector protecting bracket 30 deforms and moves the distance L4 in the front direction of the vehicle, the enclosed sectional portion 40 and the enclosed sectional portion 44 of the reflector protecting bracket 30 exist between the bumper cover 22 and the bumper reinforcement 20. Consequently, the reflector 16 will not be crushed by a colliding object K and the bumper reinforcement 20 will not deform.

Figure 7:
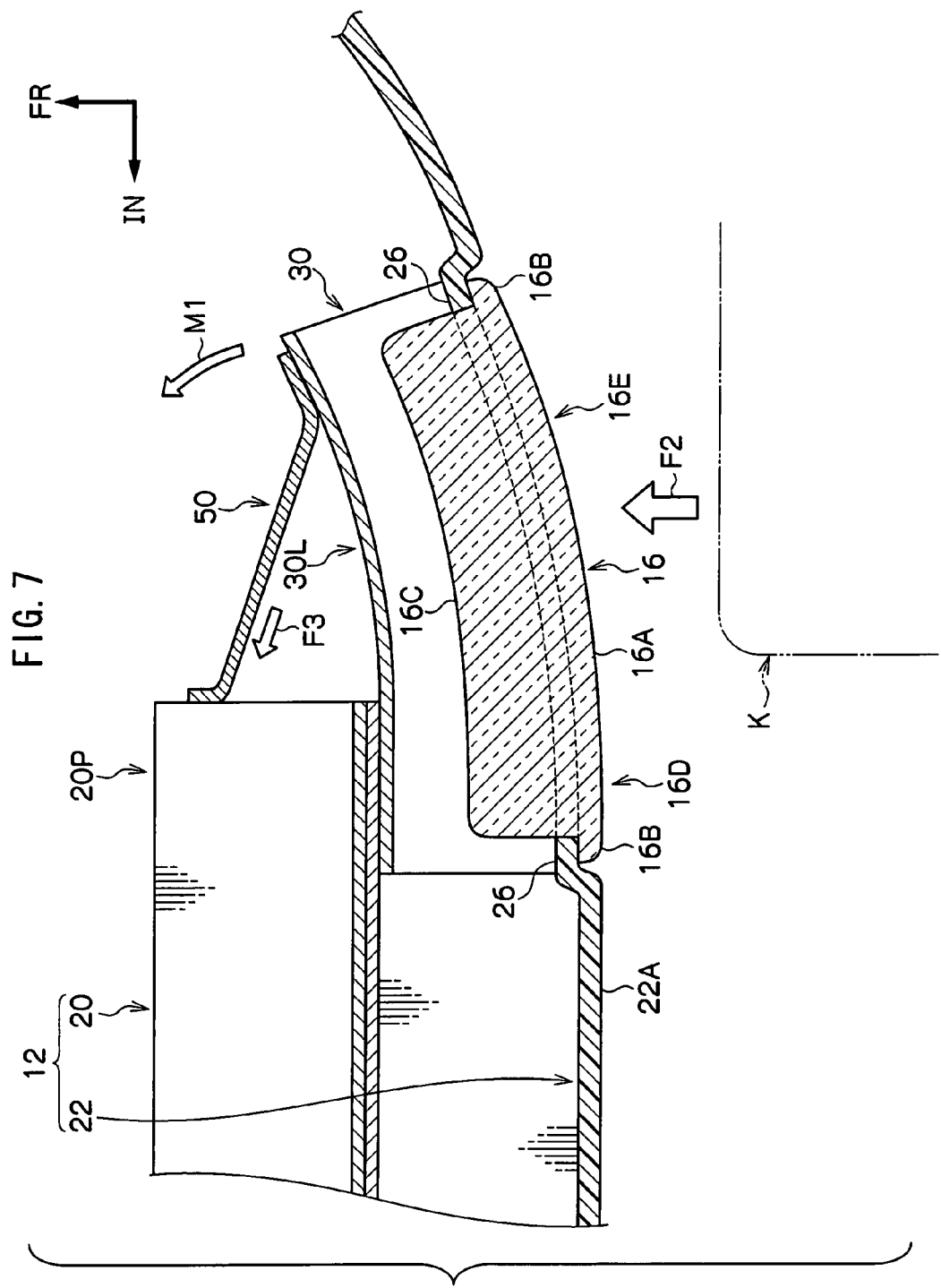
FIG. 7 is an enlarged sectional view taken along the line 7-7 in FIG. 1.

FIG. 7 shows an enlarged sectional view taken along the line 7-7 in FIG. 1.

As shown in FIG. 7, the shape of the reflector 16 as seen from above the vehicle is circular arc. The inner side portion 16D in the vehicle width direction of the reflector 16 is disposed at a vehicle rear side of an outer side portion 20P in the vehicle width direction of the bumper reinforcement 20. Further, an outer side portion 16E in the vehicle width direction of the reflector 16 is disposed at a vehicle rear side of the reinforcement bracket 50.

Therefore, when the rear bumper 12 of the vehicle 10 collides with the colliding object K such as other vehicle and a collision load (arrow F2 in FIG. 7) is applied to the outer side portion 16E in the vehicle width direction of the reflector 16 and the extending portion 30L of the reflector protecting bracket 30 in a direction from the vehicle rear side to the vehicle front side, a part F3 of the collision load F2 is transmitted to the outer side portion 20P in the vehicle width direction of the bumper reinforcement 20 by the reinforcement bracket 50. Consequently, moment (arrow M1 in FIG. 7) in the front direction of the vehicle applied to the extending portion 30L of the reflector protecting bracket 30 is suppressed, and thereby deformation of the extending portion 30L of the reflector protecting bracket 30 in the vehicle front direction is suppressed.

Next, an operation of the embodiment will be described.

When the rear bumper 12 of the vehicle 10 collides with a collision object K such as other vehicle from the rear side thereof, the bumper cover 22 provided at a vehicle rear side of the bumper reinforcement 20 with its longitudinal direction disposed along the vehicle width direction, or the reflector 16 provided on the bumper cover 22 is pressed from the vehicle rear side to the forward side of the vehicle. Consequently, the reflector 16 moves toward a bumper reinforcement side (vehicle front direction) together with the bumper cover 22.

At this time, in this embodiment, the distance L3 between the main body 16C of the reflector 16 and the intermediate portion 30E in the vertical direction of the reflector protecting bracket 30 is larger than the distance L2 between the upper vertical wall portion 30G and the lower vertical wall portion 30J of the reflector protecting bracket 30 and the vertical wall portion 22A of the bumper cover 22 along the front-rear direction of the vehicle (L3>L2).

Accordingly, when the collision load (arrow F1 in FIG. 1) is applied to the reflector 16 from the vehicle rear side to the forward side of the vehicle, and the upper vertical wall portion 30G and the lower vertical wall portion 30J of the reflector protecting bracket 30 contacts with the vertical wall portion 22A of the bumper cover 22, the main body 16C of the reflector 16 can be accommodated in the recess portion 30K of the reflector protecting bracket 30 with a space therebetween.

Further, in this embodiment, the distance between the rear wall portion 20G of the upper portion 20A of the bumper reinforcement 20 and the flanges 50G of the reinforcement bracket 50 along the front-rear direction of the vehicle is set to be L4. Thus, as long as the reflector protecting bracket 30 moves towards the front direction of the vehicle with respect to the bumper reinforcement 20 for an amount within the distance L4, the flanges 50G of the reinforcement bracket 50 will not abut the rear wall portion 20G of the upper portion 20A of the bumper reinforcement 20. Thus, deformation of the bumper reinforcement 20 can be prevented.

In this embodiment, L3≧L2+L4. Thus, even if the reflector 16 moves for the distance L2 in the vehicle front direction together with the bumper cover 22 and further the reflector protecting bracket 30 is deformed and moves for the distance L4 in the vehicle front direction, the enclosed sectional portion 40 and the enclosed sectional portion 44 of the reflector protecting bracket 30 exist between the bumper cover 22 and the bumper reinforcement 20. Consequently, the reflector 16 will not be crushed by the colliding object K and the bumper reinforcement 20 will not deform.

Accordingly, the embodiment is capable of preventing a reduction in light distribution capacity of the reflector 16 provided on the rear bumper 12 and ensuring the light distribution capacity of the reflector 16 during a collision at the vehicle rear side.

Further, according to the embodiment, as shown in FIG. 7, when the rear bumper 12 of the vehicle 10 collides with the colliding object K such as other vehicle and the collision load (arrow F2 in FIG. 7) is applied to the outer side portion 16E in the vehicle width direction of the reflector 16 and the extending portion 30L of the reflector protecting bracket 30, in the direction from the rear side to the front side of the vehicle, the part F3 of the collision load F2 is transmitted to the outer side portion 20P in the vehicle width direction of the bumper reinforcement 20 by the reinforcement bracket 50. Consequently, the moment (arrow M1 in FIG. 7) in vehicle front direction applied to the extending portion 30L of the reflector protecting bracket 30 is suppressed. As a result, deformation of the extending portion 30L of the reflector protecting bracket 30 in the vehicle front direction is suppressed.

In the assembling process of the rear bumper 12, the reflector protecting bracket 30 and the reinforcement bracket 50 are assembled to the bumper reinforcement 20 after the reflector protecting bracket 30 and the reinforcement bracket 50 are coupled. At this time, the flanges 50G of the reinforcement bracket 50 are respectively inserted into each of the upper portion 20A and the lower portion 20B. According to the embodiment, the distance L4 is formed between the rear wall portion 20G of the upper portion 20A and the flange 50G of the reinforcement bracket 50 in the front-rear direction of the vehicle. Thus, the flanges 50G of the reinforcement bracket 50 becomes unlikely to interferer with the upper portion 20A and the lower portion 20B of the bumper reinforcement 20, thereby improving installation efficiency and mass productivity.

According to the embodiment, the reflector protecting bracket 30 is constituted of the upper bracket 32 and the under bracket 34, each composed of plate material, and the reflector accommodating portion is formed by the recess portion 30K. As a result, the construction of the reflector protecting bracket 30 is simplified, and thereby mass productivity of the reflector protecting bracket 30 is improved.

Although the specific embodiment of the invention have been described in detail above, the present invention is not limited to such embodiment, but it is appreciated to those skilled in art that various embodiments of the invention may be realized within the scope of the invention. For example, although in the above embodiment, the bumper reinforcement 20 is formed by connecting the upper portion 20A having the substantially rectangular enclosed sectional structure and the lower portion 20B having the substantially rectangular enclosed sectional structure with the rear wall portion 20C, the sectional shape of the bumper reinforcement 20 as seen from the vehicle width direction may be any other rectangular shape.

Further, although in the above embodiment, the reflector protecting bracket 30 is formed of two components of the upper bracket 32 which constitutes the upper portion of the reflector protecting bracket 30 and the under bracket 34 which constitutes the lower portion of the reflector protecting bracket 30, the reflector protecting bracket 30 may be formed of a single component instead. Alternately, the reflector protecting bracket 30 may be formed of three or more components.

Although in the above embodiment, the reflector protecting bracket 30 is employed as the reflector protecting member, the reflector protecting member is not limited to the reflector protecting bracket 30 of the above embodiment. The reflector protecting member having other construction may be used as long as it is provided at the bumper reinforcement 20 and includes the bumper cover abutting portion which abuts the bumper cover 22 during a collision at the vehicle rear side and the reflector accommodating portion capable of accommodating the reflector 16 with a space when the bumper cover 22 abuts the bumper cover abutting portion.

Although in the above embodiment, the reinforcement bracket 50 is used as the reinforcement member, the reinforcement member is not limited to the reinforcement bracket 50 of the above-described embodiments. Any other reinforcement member having different configuration may be used as long as it is formed so as to connect the extending portion 30L of the reflector protecting bracket 30 with the outside end 20F in the vehicle width direction of the bumper reinforcement 20.

The present invention may be applied to a self-light emitting lamp such as a fog lamp and also may be applied to the front portion of the vehicle.

What is claimed is:

1. A vehicle rear structure comprising:
    a bumper reinforcement disposed such that the length direction thereof extends along a vehicle width direction;
    a bumper cover provided at a vehicle rear side of the bumper reinforcement;
    a reflector provided on the bumper cover such that a functional reflecting portion thereof is disposed directed towards the bumper reinforcement;
    a reflector protecting member provided in the bumper reinforcement, including a bumper cover abutting portion that abuts the bumper cover during a vehicle rear collision, and a reflector accommodating portion which accommodates the reflector with a space when the bumper cover abuts the bumper cover abutting portion;
    an upper projecting portion extending in the rear direction of the vehicle and formed at an upper portion of the reflector protecting member forming an enclosed sectional portion extending in the vehicle width direction with the upper portion of the bumper reinforcement;
    a lower projecting portion extending in the rear direction of the vehicle and formed at a lower portion of the reflector protecting member forming an enclosed sectional portion extending in the vehicle width direction with the lower portion of the bumper reinforcement;
    a reinforcement member that connects an extending portion that is formed in the reflector protecting member and that extends further outward in the vehicle width direction than the bumper reinforcement to an outside end of the bumper reinforcement in the vehicle width direction; and
    flanges formed at an inner side portion in the vehicle width direction of each of the upper and lower projecting portions, each flange being formed at the front end of a vertical wall portion and extending towards an inner side in the vehicle width direction, wherein
    the flanges are inserted into their respective upper portion and lower portion; and
    disposed between the flanges and the flanges' respective rear wall portions of the upper portion and the lower portion are spaces extending in a vehicle front-rear direction, wherein:
    an equation $L3 \geq L2+L4$ is satisfied, where $L3$ is a distance between the reflector and the reflector accommodating portion, $L2$ is a distance in the vehicle front-rear direction between the bumper cover and the bumper cover abutting portion, and $L4$ is a distance in the vehicle front-rear direction between the flanges and the flanges' respective rear wall portions.

2. The vehicle rear structure according to claim 1, wherein the reflector protecting member includes a flexed plate mounted on the bumper reinforcement, and the reflector accommodating portion includes a recess portion that the reflector enters.

* * * * *